United States Patent [19]

Pister et al.

[11] 4,200,678
[45] Apr. 29, 1980

[54] FLEXIBLE MULTILAYER MAGNETIC RECORDING MEDIUM

[75] Inventors: Philipp Pister, Hassloch; Franz Buettner, Ludwigshafen; Fritz Hammon; Manfred Ohlinger, both of Frankenthal; Heinz Stritzinger, Ludwigshafen; Job-Werner Hartmann, Ludwigshafen; Walter Schneider, Ludwigshafen, all of Fed. Rep. of Germany

[73] Assignee: BASF Aktiengesellschaft, Fed. Rep. of Germany

[21] Appl. No.: 891,541

[22] Filed: Mar. 30, 1978

Related U.S. Application Data

[63] Continuation of Ser. No. 758,719, Jan. 3, 1977, abandoned, which is a continuation of Ser. No. 642,070, Dec. 18, 1975, abandoned.

[30] Foreign Application Priority Data

Dec. 31, 1974 [DE] Fed. Rep. of Germany ....... 2461936

[51] Int. Cl.$^2$ ............................................. H01F 10/02
[52] U.S. Cl. ..................................... 428/329; 428/900
[58] Field of Search .................................. 427/127–132, 427/48; 428/329, 900

[56] References Cited

U.S. PATENT DOCUMENTS 3,761,311   9/1973   Perrington et al. .................. 117/239

OTHER PUBLICATIONS

Spratt, 1965, pp. 115–117, Magnetic Tape Recording.

Primary Examiner—Bernard D. Pianalto
Attorney, Agent, or Firm—Keil & Witherspoon

[57] ABSTRACT

A flexible multilayer magnetic recording medium exhibiting an improved signal-to-print-through ratio coupled with an improved maximum output level and diminished dc noise, comprising a non-magnetic base and, applied thereto, at least two superposed layers consisting of a binder with magnetizable particles uniformly dispersed therein, the upper magnetic layer containing a magnetic pigment giving a signal-to-print-through ratio of less than 55db and the lower magnetic layer(s) containing a magnetic pigment giving a signal-to-print-through ratio of 55 db or more.

3 Claims, No Drawings

FLEXIBLE MULTILAYER MAGNETIC RECORDING MEDIUM

This is a continuation, of application Ser. No. 758,719 filed Jan. 3, 1977 and now abandoned which is a continuation of Ser. No. 642,070 filed Dec. 12, 1975 and now abandoned.

The present invention relates to a flexible multilayer magnetic recording medium exhibiting an improved signal-to-print-through ratio coupled with an improved maximum output level and diminished dc noise, comprising a non-magnetic base and, applied thereto, at least two superposed layers consisting of a binder with magnetizable particles uniformly dispersed therein.

A number of multilayer magnetic recording medi are disclosed in the literature. At an early stage steps were taken to improve the frequency response of a magnetic tape by the provision of at least two layers, the magnetic properties of the individual layers being correlated to the configuration of the magnetic field produced by the recording head, in respect of long and short wavelengths. This was achieved by using different ratios of coercive force to residual induction (U.S. Pat. Nos. 2,643,130 and 2,691,072), by using correlated coercive forces (U.S. Pat. No. 2,647,954 and German Printed Application No. 1,285,005) and by orientation of the magnetic particles in the individual layers in different directions (U.S. Pat. Nos. 3,185,775 and 3,052,567 and German Printed Application No. 1,279,089).

Attempts have also been made to improve the recording sensitivity by using a multilayer medium, specifically by increasing the packing density of magnetic pigment in the outer layer (British Patent No. 997,439). On applying the above teachings to the recording of very short wavelengths at very low tape speeds, it was found that it was advantageous to match the coercive force of the outer layer to the total thickness of the individual layers (U.S. Pat. No. 3,761,311). It has also already been disclosed that the mechanical properties of a magnetic tape, and specifically of the magnetic layer, can be improved by employing a suitable upper layer, which either comprises a particularly abrasion-resistant binder (German Printed Application No. 1,280,931) or a pressure-insensitive magnetic pigment in the upper layer (German Printed Application No. 1,938,006) or a magnetic pigment which causes less head wear (German Printed Application No. 2,305,247). The problem raised by the use of magnetic pigments of improved residual induction but lower magnetic stability under mechanical stress has been solved by using an outer layer containing a stable magnetic pigment (U.S. Pat. No. 2,941,901). It is also known that the marked modulation noise produced by multilayer magnetic tapes as a result of irregularities at the interface of the layers can be reduced by following a particular procedure.

The above measures frequently improve the recording quality but do not improve the signal-to-print-through ratio. The latter is the ratio of the output voltage of a signal having a frequency of 1 kc/s recorded at maximum level at 38 cm/sec tape speed to that of a copy thereof produced by winding the length of magnetic tape with the recorded signal on the adjacent turns of tape after a storage period of 24 hours at room temperature. For modern recording and playback equipment it has proved necessary to improve the signal-to-print-through ratios, in addition to other parameters. The low noise level and improved sensitivity of modern magnetic tapes and tape recorders means that even faint print-through echoes are objectionable. Magnetic materials with a low print-through effect require special methods of manufacture, and special measures must be taken when they are incorporated into the binder. On the other hand, the manufacture of low-noise magnetic recording media in particular makes demands on the magnetic material which are not compatible with optimum signal-to-print-through ratios.

It is an object of the present invention to provide a flexible magnetic recording medium with at least two magnetic layers, which enables the advantages of a multilayer magnetic tape to be fully achieved without magnetic pigments which give high signal-to-print-through ratios having to be employed in each layer, the resulting magnetic recording medium nevertheless exhibiting the requisite high signal-to-print-through ratio.

We have found that this object is achieved and that multilayer magnetic recording media which meet these requirements are obtained if the upper magnetic layer of the medium contains a magnetic pigment giving a signal-to-print-through ratio of less than 55 db and the lower magnetic layer(s) contain a magnetic pigment giving a signal-to-print-through ratio of 55 db or more.

In a particular embodiment of the invention, the multilayer magnetic recording medium consists of three magnetic layers, the magnetic pigment of the upper layer giving a signal-to-print-through ratio of less than 53 db, the magnetic pigment of the middle layer giving values of from 53 to 56 db and the magnetic pigment of the lower layer, which is directly in contact with the base, giving values of more than 56 db.

In a particularly advantageous embodiment, the upper layer of the magnetic recording medium accounts for from 10 to 40% of the total thickness of the individual layers, the middle layer, if present, accounts for from 20 to 60% and the lower layer accounts for from 50 to 80%.

The advantage of the multilayer magnetic recording media of the invention is that, by using two or more pigments which differ only in their print-through effects but do not differ essentially in their general magnetic properties, in two or more separate layers, the lower print-through effect of the combined magnetic layer system is almost unchanged through the pigment having this lower effect is only present in the lowermost layer(s).

This is surprising since it is known that, if a magnetic pigment giving a low signal-to-print-through ratio is mixed with another magnetic pigment giving a high signal-to-print-through ratio, the single-layer magnetic recording medium obtained exhibits a corresponding intermediate signal-to-print-through ratio.

It is also surprising that the maximum output level of the multilayer magnetic recording medium of the invention is substantially higher than was to be expected from the nature of the individual layers.

Suitable magnetic pigments are the conventional acicular gamma-iron(III) oxides; such magnetic pigments giving high signal-to-print-through ratios can be manufactured, e.g., in accordance with German Published Application No. 2,254,810.

To determine the signal-to-print-through ratio, a magnetic dispersion is first prepared in the following manner:

900 parts of a finely divided acicular gamma-iron oxide having an average particle length of less than $0.8\mu$, 850 parts of tetrahydrofuran and 850 parts of toluene, in which 280 parts of a copolymer containing 91% of vinyl chloride units, 3% of vinyl acetate units and 6% of vinyl alcohol units have been dissolved, and 75 parts of a fluid mixture of 2% of fatty acids of 12 carbon atoms, 9% of fatty acids of 14 carbon atoms, 15% of fatty acids of 16 carbon atoms, 72% of fatty acids of 18 carbon atoms and 2% of higher fatty acids, the mixture comprising about 92% of isomerized fatty acids, are dispersed, in a ball mill having a capacity of from 6,000 to 10,000 parts by volume and, filled with from 8,000 to 12,000 parts of steel balls, until a smooth and homogeneous coating is obtained on applying the dispersion to a plastics film using a manual coating device. The dispersion is filtered through a layer of cellulose fibers and asbestos fibers, applied to a $15\mu$ thick polyethylene terephthalate base film, and dried at about 100° C.

Whilst the magnetic layer is still fluid, it is passed through an apparatus for magnetically orienting the anisotropic magnetic particles, which apparatus is so arranged that the residual induction in the direction of orientation is 1.7 times the residual induction in the direction at right angles thereto. The magnetic and electroacoustic properties are measured after calendering the coated web by passing it between polished steel and polyamide rolls at room temperature, under a nip pressure of 100 kg/cm.

The magnetic web thus obtained is slit into ¼ inch wide tapes. The signal-to-print-through ratio is determined as follows:

A signal having a frequency of 1 kc/s is recorded on the magnetic tape, every 8th revolution of a hub having a diameter of 280 mm, at a recording level of 32 milli-Maxwell and 38 cm/sec tape speed. The wound tape is then stored for 24 hours at 24° C. The tape is then played back through a 1 kc/s band pass filter. The ratio of the maximum signal level of the recording to the print-through echo on the adjacent turns of the tape pack in db, is measured.

For the purposes of the invention, it has proved advantageous—in order to obtain recording media exhibiting improved mechanical properties—to use, in the magnetic layer next to the tape base, a binder having a tensile strength of at least 400 kg/mm$^2$ and an elongation at break of less than 15% and preferably less than 10%, and to use in the upper magnetic layer a binder having a tensile strength of from 360 to 500 kg/mm$^2$ and an elongation at break of at least 300% and preferably greater than 400%. The former set of conditions is above all fulfilled by vinyl copolymers and the latter by polyurethane binders. We have found that the binder of the magnetic layer adjacent to the base should have a Shore A hardness of at least 95 and preferably at least 100, whilst the binder of the upper magnetic layer, i.e. the layer in contact with the magnetic head, should have a lower Shore hardness, namely from 70 to 95 and preferably from 75 to 85.

The magnetic recording media according to the invention are manufactured by conventional methods. The non-magnetic bases used are those conventionally employed, in particular films of linear polyesters, e.g. polyethylene terephthalate. The magnetic dispersion prepared from the magnetic pigment and a solution of the binder or binders in the presence of a dispersing agent and other additives in dispersing apparatus, e.g. a tube mill or a stirred ball mill, is advantageously applied to the base by means of conventional coating equipment, homogeneous layers being applied successively to the base. After orientation of the magnetic particles, the applied layer of coating mixture is dried, advantageously for from 2 to 5 minutes at from 50° to 90° C. Processes by means of which two or more magnetic coatings may be applied to the base without there being any need to first dry the lowermost coating(s) have also been disclosed, and these may also be used for the manufacture of the magnetic recording media of the invention.

The magnetic coatings may be subjected to a conventional surface treatment, e.g. calendering in which the coated base material is passed between polished rolls with the application of pressure and optional heating at from 50° to 100° C., preferably from 60° to 80° C. After this treatment, the total thickness of the magnetic layers is generally from 3 to 20$\mu$ and preferably from 8 to 15$\mu$.

After slitting the coated webs into magnetic tapes, the electroacoustic properties of the latter can be determined by conventional methods.

The following Examples show the surprising advantages of the magnetic recording media of the invention. In these Examples, parts and percentages are by weight, unless stated otherwise.

EXAMPLE 1

A magnetic dispersion having the following composition is prepared: 22.5 percent of acicular gamma-iron (III) oxide ($H_c$=25 kiloamps/m), 0.5 percent of sodium oleate, 0.5 percent of silicate powder (particle size less than 1$\mu$), 149.5 percent of a 10% strength solution of polyvinylformal in a solvent mixture of equal parts of tetrahydrofuran and dioxane, 26.5 percent of the same solvent mixture, 0.1 percent of polydimethylsiloxane and 0.7 percent of diisodecyl phthalate.

This dispersion will hereinafter be referred to as magnetic dispersion A, and a 16$\mu$ thick layer thereof gives a signal-to-print-through ratio of 51 db. A magnetic dispersion B having the same composition is prepared, except that a heat-treated gamma-iron(III) oxide is used as the magnetic pigment; a 16$\mu$ thick layer of this dispersion gives a signal-to-print-through ratio of 53 db.

A 30$\mu$ polyethylene terephthalate film is coated as follows (the thickness of the dry coatings being measured):

Experiment 1.1: 12$\mu$ of magnetic dispersion B adjacent to the base, followed by 4$\mu$ of magnetic dispersion A.

Experiment 1.2: 16$\mu$ of magnetic dispersion A (Comparative Experiment)

Experiment 1.3: 16$\mu$ of magnetic dispersion B (Comparative Experiment).

|  | Experiment | | |
| --- | --- | --- | --- |
|  | 1.1 | 1.2 | 1.3 |
| (according to DIN 45,519) Distortion ratio (db) | 41.5 | 40.0 | 38.5 |
| dc noise (db) | 47 | 46 | 41 |
| signal-to-print-through ratio (db) | 55 | 51 | 53 |

EXAMPLE 2

A magnetic dispersion 1 is prepared by dispersing 750 parts of gamma-iron(III) oxide ($H_c$=22.3 kiloamps/m) as the magnetic pigment, 15 parts of stearic acid, 762.5 parts of a solvent mixture of equal parts of tetrahydrofuran and toluene and 625 parts of a 20% strength solution of a copolymer containing 80 percent of vinyl chloride units, 10 percent of ethyl maleate units and 10 percent of methyl maleate units in the above solvent mixture, for 3 days in a steel ball mill. 261 parts of the above copolymer solution are added per 900 parts of the above dispersion, and are mixed in thoroughly for one hour using a high-speed stirrer.

A further magnetic dispersion 2 is prepared by dispersing 60 parts of gamma-iron(III) oxide ($H_c=22.1$ kiloamps/m) as the magnetic pigment, 47.9 parts of a solvent mixture of equal parts of tetrahydrofuran and toluene, 6.6 parts of isostearic acid and 75.7 parts of a 25% strength solution of a copolymer, derived from vinyl chloride and vinyl acetate and containing OH groups for from 3 to 4 days in a steel ball mill.

A $30\mu$ polyester film is coated as follows:

Experiment 2.1: $15\mu$ of magnetic dispersion 1 (Comparative Experiment)

Experiment 2.2: $15\mu$ of magnetic dispersion 2 (Comparative Experiment)

Experiment 2.3: $8\mu$ of magnetic dispersion 1 adjacent to the base, followed by $7\mu$ of magnetic dispersion 2.

|  | Experiment | | |
| --- | --- | --- | --- |
|  | 2.1 | 2.2 | 2.3 |
| Sensitivity (db) | −0.6 | −0.4 | +0.7 |
| Distortion ratio (db) | 35.8 | 39.5 | 40.0 |
| dc noise (db) | 42 | 47 | 48 |
| signal-to-noise ratio (db) | 60 | 63.7 | 63.8 |
| signal-to-print-through ratio (db) | 58.5 | 54.5 | 56.5 |
| surface resistance per square (gigaohm) | 1.5 | 8 | 0.3 |
| errors/km | 37 | 43 | 7 |

A magnetic dispersion 3 is prepared which has the same composition as magnetic dispersion 1 of Example 2, except that a gamma-iron(III) oxide ($H_c=22.0$ kiloamps/m) is used as magnetic pigment. A further magnetic dispersion 4 is prepared which has the same composition as magnetic dispersion 2 of Example 2, except that a gamma-iron(III) oxide ($H_c=22.3$ kiloamps/m) is employed as the magnetic pigment.

A $30\mu$ polyester film is coated as follows:

Experiment 3.1: $16\mu$ of magnetic dispersion 3 (Comparative Experiment)

Experiment 3.2: $16\mu$ of magnetic dispersion 4 (Comparative Experiment)

Experiment 3.3: $11\mu$ of magnetic dispersion 3 adjacent to the base, followed by $5\mu$ of magnetic dispersion 4.

|  | Experiment | | |
| --- | --- | --- | --- |
|  | 3.1 | 3.2 | 3.3 |
| Sensitivity (db) | 0 | −0.25 | +1.4 |
| Distortion ratio (db) | 36.7 | 39 | 41.3 |
| dc noise (db) | 44 | 44 | 46 |
| signal-to-noise ratio (db) | 61.3 | 63.7 | 63.0 |
| signal-to-print-through ratio (db) | 55.5 | 53 | 55.5 |

We claim:

1. A magnetic recording medium comprising a base and, applied thereto, at least two magnetic layers containing an acicular magnetic material in an organic binder system, wherein the upper magnetic layer contains a magnetic pigment giving a signal-to-print-through ratio of less than 55 db and the lower magnetic layer(s) contain magnetic pigments giving a signal-to-print-through ratio of 55 db or more, wherein the said magnetic pigments do not differ essentially in their magnetic properties, and wherein the minimum difference between the signal-to-print-through ratios of the upper and lower layers is at least 2.5 db.

2. A magnetic recording medium comprising a base and, applied thereto, three magnetic layers containing an acicular magnetic pigment in an organic binder system, the magnetic pigment of the upper layer giving a signal-to-print-through ratio of less than 53 db, the magnetic pigment of the middle layer giving values of from 53 to 56 db and the magnetic pigment of the lower layer, which is directly in contact with the base, giving values of more than 56 db, wherein the said magnetic pigments do not differ essentially in their magnetic properties, and wherein the minimum difference between the signal-to-print-through ratios of the upper layer and the layer directly in contact with the base is greater than 3 db.

3. A magnetic recording medium as set forth in claim 2, wherein the upper magnetic layer accounts for from 10 to 40% of the total thickness of the layers, the middle layer accounts for from 20 to 60% and the lower layer accounts for from 50 to 80%.

* * * * *